Patented Nov. 18, 1947

2,431,211

UNITED STATES PATENT OFFICE 2,431,211

IMPRESSION MIXTURES AND INGREDIENT THEREFOR

Vance V. Vallandigham, Chicago, Ill., assignor to Coe Laboratories, Inc., Chicago, Ill., a corporation of Illinois No Drawing. Application August 13, 1942, Serial No. 454,731

1 Claim. (Cl. 252—358)

The present invention relates generally to impression materials, and, more particularly, to impression materials adapted for use in taking dental impressions.

In dentistry the field of dental prosthesis is of singular importance in making the requisite replacements and adjustments of the teeth as the situation requires. To obtain accurate impressions of the oral parts the dental profession demands materials of exacting physical characteristics, and it is to meet this demand that the present invention is directed.

Therefore, a primary object of this invention is to provide impression materials suitable for use in taking dental impressions of a high degree of accuracy.

Another object of the invention is to provide improved dental impression materials which can be quickly prepared when needed, and which may be used with a minimum of inconvenience even to uncooperative patients.

Still another object of the invention is to enlarge the field of materials available for such compositions, with the result that materials which are not useful when used in their normal form as an ingredient, become useful in a new form.

The type of materials to which the present invention applies consists generally of dry, moist or wet mixed or unmixed materials, and preferably a single dry mixture, to be mixed with an aqueous liquid, preferably water, which aqueous mixture has the property of setting by chemical or physical action and is allowed to set against a pattern, such as the human gum with or without teeth, in its preferred use in dentistry. The setting is the result of a gelation of a soluble substance used as a component of such a mixture. The gelation is induced by the presence of another component of the mixture, which component may be present with said gelatinizable component in the absence of water. The gellable material is herein referred to as the gel-forming component. The causative agent for gelling the mixture is broadly referred to as the gel-precipitant. In addition there may be, and usually is, a third component which acts to delay the beginning of gelation or setting. This is broadly referred to as the retarding agent. A non-aqueous component of the liquid may also serve as a retarding agent, and solid and liquid retarding agents may be used together.

Gel-forming ingredients which may be used in the present invention are of two types, which, however, act in the same way with but slight supposed differences in their mechanisms. In each case a colloidal sol is converted to a colloidal gel by action of the gel-precipitant on the sol. Water-soluble salts, such as alginate salts, and water-soluble pectate salts constitute one type of ingredient, hereinafter referred to as the salt type. Water-soluble colloids, such as algins, and water-soluble pectins constitute the second type of ingredient, hereinafter referred to as the colloid type.

In the salt-type of gel-formers, certain salts such as the alkali-metal, magnesium, ammonium and various amine salts are water-soluble, and certain other salts, such as the alkali-earth metal and other heavy metals, are water-insoluble, and when formed from the water-soluble salts or other forms, are precipitated or formed as gels.

In the colloid type of gel-formers, the material is soluble in one form and in the presence of certain ions in adequate concentration, the sol is converted to a gel. The action of pectin in jelly formation is an example. It so happens that some ions which precipitate the salt-type also gel the colloid type, and those ions which form soluble salts of the salt type, do not precipitate the colloid type.

Therefore impression mixtures are made essentially of gel-formers and gel-precipitants. However, for economy in use of such materials, for assuring quicker final setting, and for assuring quick setting to a more dimensionally stable mold, the gel to be formed is used as a binder for filler particles which are also present in any mixture which is to gel. Broadly, the term "filler" is applied to such material and it is preferably inert, mineral, and water-insoluble. However, it may be not inert chemically, because part of it may enter into solution and provide the gel-precipitant, the part not dissolving being inert. This is the case where certain materials, such as calcium sulfate and barium thiosulfate, may be employed, both as gel-precipitant and as filler. Filler may also be vegetable or mineral fibers, wood flour or other material. Where filler is omitted, the whole mold is a gel, and although such gel mold is useful, it does not have the utility resulting from the rigidity which obtains when filler is used and the gel provides a bond for the particles of filler. By control of the amount of filler in proportion to gel to be formed, the fluidity or consistency of the mix before setting and the flexibility and rigidity after setting may be varied as desired. The filler provides body, controls consistency and also controllably affects the set. It may be used to affect the time of set, the rate of setting, and the character of the set product.

One of the difficulties encountered in such compositions is to find a gel-precipitant which does not induce too quick a setting of the aqueous mixture. For the alkali-alginates for example, calcium sulfate is a suitable gel-precipitant, having a slow rate of solubility. Used as filler, it may function also as gel-precipitant. Even so, it may require and usually requires in commercial dental practice a retarding agent to delay the gelling period. Tri-sodium phosphate is a suitable retarding agent for water as the liquid and for less aqueous liquids such as water plus ethyl alcohol, the latter also exerting a retarding function. Tri-sodium phosphate added as a crystal component dissolves quickly. As calcium sulfate is more slowly dissolved the retarding agent acts with it to precipitate an insoluble calcium phosphate, thus preventing the accumulation of calcium ions to convert the soluble alginate to a gel-form insoluble alginate. When the retarding agent is thus used up, then the gelation is initiated. The amount of the retarding agent for a constant liquid composition may be varied to time the mix as to the beginning of the setting action.

The same sort of retarding may be obtained with other gel-formers when certain gel-precipitants, such as calcium sulfate, are used. There are few satisfactory materials which may be substituted directly for calcium sulfate.

The value of calcium sulfate is neither in the calcium ions nor in the sulfate ions, because cations other than calcium will perform in the same way and because the sulfate ion has no necessary function insofar as the gelling is concerned. The true merit of calcium sulfate lies in its slow rate of solubility to build up a concentration of calcium ions to induce gelation.

According to the present invention, other materials not satisfactory per se, like calcium sulfate, are rendered so by a process herein termed "blocking." Broadly, this signifies a treatment to lessen the normal availability of the desired precipitating ions, when a mix containing "blocked" gel-precipitant is combined with water. The blocking depends upon the blocked particles yielding the cations by the process of diffusion. The gel-precipitant is immediately unavailable at the surface of the particle, and moves from the interior of the particle by the slow process of diffusion.

The gel-precipitant is blocked by coating particles thereof with a water-insoluble, slowly soluble, or slightly soluble, water-absorbing substance.

Gelatinous water-insoluble materials are the preferred blocking agents, but the invention is not limited to them.

Each batch must be tested for determining how much of any particular retarding agent, where one is needed, must be employed for a given period of delay. However, it should be understood that crystals of soluble gel-precipitant materials may be so well coated that no gelling will occur until diffusion from the particle has been initiated and effected. The period for water to penetrate the coating will give a delay in gelling. To standardize this delay, the coating also must be standardized, assuming no retarding agent to be present.

The preferred method of employing the invention, especially for dentistry, is to provide a dry mixture of all the ingredients with a specification of the amount of water to be used with a given amount of the mixture. However, it is to be understood that the objective is to keep water away from gel-precipitant and gel-former, when they are present together, each with the other.

Numerous diluents for water, to lessen the normal aquosity of liquid water may be used even up to 50%. These cause a mixture otherwise gellable in water in a given time, to gel in a much slower time. By the addition of such non-aqueous liquids, a normal setting time in water of say three to four minutes has been slowed to fifty minutes in the case of using 50% of ethyl glycol in the liquid. Suitable agents are ethyl alcohol, ethylene glycol, diethylene glycol, ethyl glycol, methyl ethyl glycol, isopropyl alcohol, and many others, of which only harmless ones useful for denture work are named above. Of course it is to be understood that the aquosity of the liquid is not reduced to the point where any one of the necessary normally soluble-in-water ingredients becomes insoluble. The soluble alginate may be replaced by a soluble pectate or other suitable gellable sol.

The following examples illustrate the invention:

*Example 1.—Blocked agent*

Sixty grams of dry powdered calcium gluconate are dropped into a solution of soluble alginate, such as the potassium or sodium salt, of ten grams per liter with vigorous agitation. The effect is to precipitate calcium alginate about the particles before they dissolve. The mass is filtered off before the calcium gluconate is completely dissolved. The gel particles are thus encapsulated calcium gluconate particles, and they maintain their separate forms while being filtered. They are then dried, and the resulting particles are useful as blocked gel-precipitant in an impression mixture.

*Example 2.—Impression mixture*

| | Grams |
|---|---|
| Potassium alginate | 4 |
| Blocked reagent of Example 1 | 9 |
| Trisodium phosphate (Na$_3$PO$_4$.12H$_2$O) | 1.5 |

*Example 3.—Impression mixture*

In Example 2, substitute potassium, sodium or ammonium pectate for the potassium alginate in the same amount.

*Example 4.—Impression mixture*

Substitute water-soluble algin for the potassium alginate of Example 2 in the same amount.

*Example 5.—Blocked agent*

In Example 1 substitute calcium hydroxide, Ca(OH)$_2$ in amount equivalent in terms of CaO to the calcium gluconate. This produces blocked particles diffusively yielding both calcium and hydroxyl ions when put into water, and it can be used as a source of calcium ions for precipitating pectates, alginates or algin, and as a source of hydroxyl ions to precipitate pectin.

*Example 6.—Impression mixture*

| | Grams |
|---|---|
| Dry pectin | 5 |
| Sodium citrate | 5 |
| Blocked agent of Example 5 | 9 |
| Magnesium carbonate | 25 |

The sodium citrate is a retarder for the above pectin gelatin, and it acts by some unknown mechanism. Sodium hexametaphosphate is also a like retarder. Since these thicken the pectin solution, they may act as retarders by slowing the normal processes of diffusion.

Example 7

| | Grams |
|---|---|
| Potassium alginate | 2 to 4.6 |
| Water | 100 |

The above as a solution is used to receive 2 grams of dry, blocked reagent of Example 5 or Example 1, which is sifted in and well mixed prior to the diffusion of calcium ions to the point of effecting gelation. The fluid or plastic mass, prior to the setting of the gel, is placed in position against the pattern and allowed ot stand until gelling action is completed. Then the gel-mold lacking filler and the pattern are suitably parted, and the gel-mold used, for example, to receive plaster of Paris, to make a plaster model of the pattern.

From the foregoing it will be clear that a wide variety of materials chemically suitable for the reaction of gel-precipitants, but physically not at all or not well adapted to such use, may be treated or "blocked" to produce a complex structure containing them which structure is a useful ingredient for impression mixtures. It will also be apparent that these blocked agents may be used in a wide variety of mixtures and preferably with the colloidal type of gel-forming materials, preferably the water-soluble alginates, algins, pectates and pectins.

Since the invention makes available as gel-precipitants many materials not per se suitable as ingredients of impression mixtures, it has not been attempted herein to name all the available agents which may be subject to the blocking treatment for the purposes herein described. Those skilled in the art will readily appreciate from the materials mentioned herein and the materials specifically illustrated, that others not mentioned may be used, and that impression mixtures not specifically disclosed may be compounded to use the blocked gel-precipitants of the present invention.

Therefore, the invention is not to be considered as limited to any by the preferred examples herein given. Numerous changes and modifications are contemplated as falling within the scope of the appended claim.

I claim:

The method of preparing a gel-precipitant ingredient having a retarded action for an aqueous gelatinizable mixture containing a gel-forming ingredient which gels by the action thereon of a gel-precipitant, said method comprising adding with agitation finely divided particles of solid ion-supplying gel-precipitant to an aqueous solution of gellable sol which is gelatinized by a solution of said gel-precipitant, whereby to effect immediately a gel-formation about said particles, separating said gel-coated particles from solution prior to dissolution of the solid particles, superficially washing the separated gel-coated particles, and drying the washed particles.

VANCE V. VALLANDIGHAM.

REFERENCES CITED

The following references are of record in the file of this patent:

UNITED STATES PATENTS

| Number | Name | Date |
|---|---|---|
| 1,564,433 | Mase | Dec. 8, 1925 |
| 1,985,205 | Derr | Dec. 18, 1934 |
| 1,985,900 | Kleiner | Jan. 1, 1935 |
| 2,021,059 | Harrison | Nov. 12, 1935 |
| 2,135,936 | Gamble et al. | Nov. 8, 1938 |
| 2,249,694 | Wilding | July 15, 1941 |
| 2,259,638 | Heckert | Oct. 21, 1941 |
| 2,265,118 | Rossem | Dec. 2, 1941 |
| 2,304,308 | Hurd | Dec. 8, 1942 |
| 2,325,051 | Gross | July 27, 1943 |
| 2,331,598 | Cook et al. | Oct. 12, 1943 |